Figure 1:
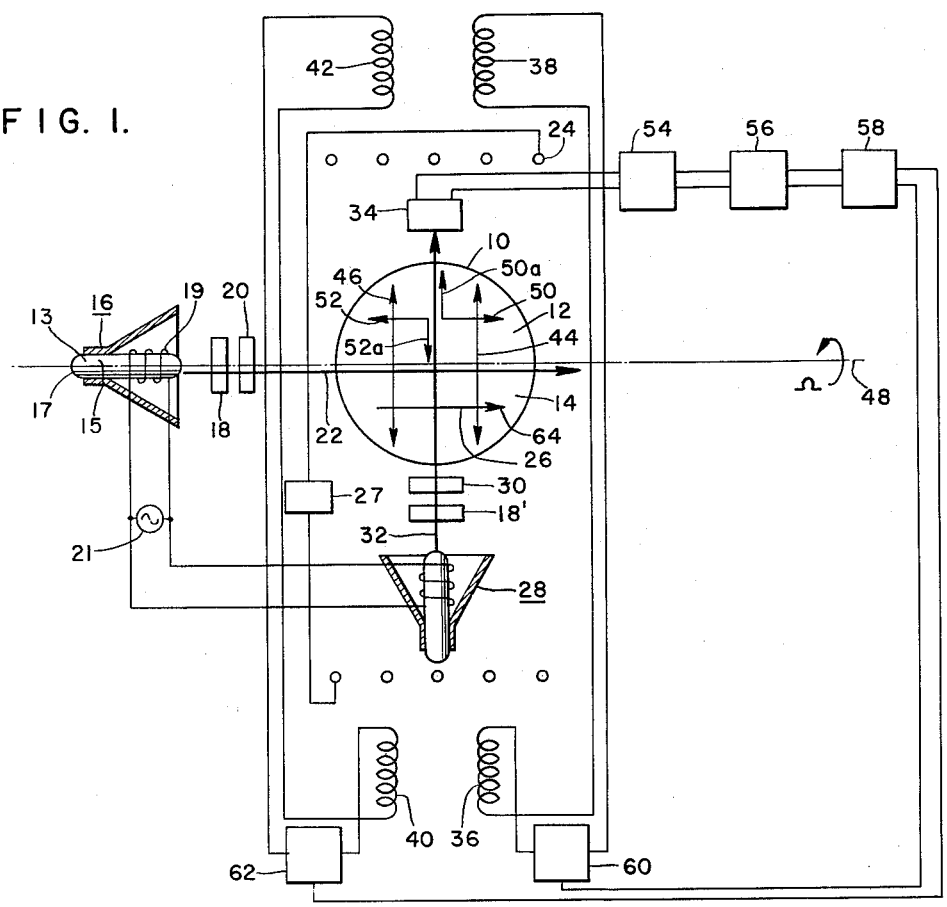

March 29, 1966 J. M. ANDRES 3,243,694
GAS CELL ARRANGEMENT
Filed Dec. 30, 1960

INVENTOR.
JOHN MILTON ANDRES
BY Albert Rosen
ATTORNEY.

United States Patent Office 3,243,694
Patented Mar. 29, 1966

3,243,694
GAS CELL ARRANGEMENT
John Milton Andres, Rolling Hills Estates, Calif., assignor, by mesne assignments, to TRW Inc., a corporation of Ohio
Filed Dec. 30, 1960, Ser. No. 79,785
7 Claims. (Cl. 324—.5)

This invention relates to a gas cell for use in atomic resonance systems and, more particularly, to an improved gas cell for an atomic gyroscope system utilizing detection of atomic resonance frequency variations to measure angular rotation rates.

Arrangements are known wherein the frequency associated with particular quantum transitions of a resonant medium contained within a gas cell is detected to provide an information signal. In one of these arrangements, effects induced by an angular rotation upon a particular quantum transition in a resonant medium are measured to provide an indication of the rotational rate. Devices of this type are generally termed atomic gyroscopes. The invention herein is an improvement on the copending application Serial Number 17,591, filed on March 25, 1960, entitled "Gyromagnetic Method and Apparatus" and assigned to the assignee of this application, now Patent 3,214,683.

It has been found that variations in the magnetic field environment surrounding an atomic gyroscope tend to mask the effects of an angular rotation upon the particular quantum transition of the resonant medium that is useful in gyroscopic applications. To overcome this masking effect caused by variations in magnetic field strength, two resonant media may be incorporated in an atomic gyroscope and a comparison of the signal obtained by simultaneous measurement of the particular quantum transition in each of the media provides an indication of actual rotation rate. In such an arrangement, it has sometimes proven difficult to insure that both resonant media are subjected on identical magnetic field environments and also to provide a strong signal for very low rotational rates.

Accordingly, it is an object of this invention to provide an improved gas cell arrangement for utilization in measuring angular rotation.

It is a further object of this invention to provide improved methods of and means for enhancing the signal strength of an atomic gyroscopic system for low angular rotation rates.

The foregoing and related objects are achieved, in accordance with the principles of this invention, by selecting two resonant media having particular quantum characteristics for inclusion in the system and by positioning the two resonant media in a unique orientation. In one embodiment of this invention, a first resonant medium is selected that exhibits a positive net magnetic moment and a second resonant medium is selected that exhibits a negative net magnetic moment. These two resonant media are contained in a single gas cell. When the gas cell arrangement and the resonant media are subjected to an angular rotation, the apparent Larmor frequency of the first resonant medium increases and the apparent Larmor frequency of the second resonant medium decreases in proportion to the angular rotation rate. Simultaneous detection of the apparent Larmor frequency in each of the resonant medium provides an output signal indicative of the actual angular rotation. Since the sign of the net magnetic moment of each resonant media is opposite, the output signal is greater in magnitude for a given rotation rate than if media of the same sign are utilized, thereby enhancing the signal strength for very low angular rotation rates. Further, by incorporating both resonant media in the same gas cell, they are both subjected to substantially the same magnetic field environment and the masking effects of variations in the magnetic field environment may be eliminated to determine the true angular rotation rate.

In another embodiment of this invention, each resonant medium is contained in a separate gas cell and the gas cells are in close juxtaposition to provide uniform magnetic field environment. This arrangement is particularly useful when the two selected resonant media are not compatible for operation in the same gas cell.

Figure 2:
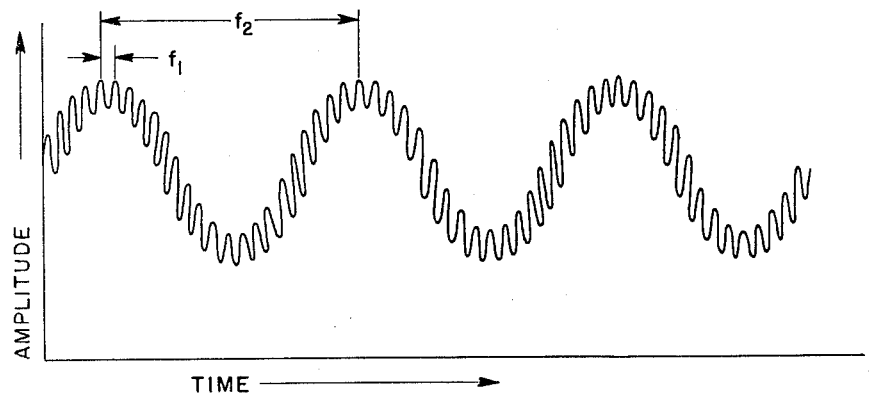

The invention is explained in greater detail in the following description and with reference to the accompanying drawing wherein like reference characters indicate similar elements throughout and in which:

FIGURE 1 is a schematic representation of the apparatus useful in practicing this invention; and FIGURE 2 is a graph illustrating the operational characteristics of this invention.

In the presence of a weak unidirectional magnetic field, resonant media undergo Zeeman splitting into a plurality of magnetic substates. The frequency associated with the energy separation between any two adjacent magnetic substates is termed the Larmor frequency and the Larmor frequency increases with increasing unidirectional magnetic field strength. It has been found that by applying preselected wavelengths of electromagnetic radiation to a resonant medium in the presence of a weak unidirectional magnetic field, the particles comprising the resonant medium may be aligned into one particular predetermined magnetic substate. This process is termed optical pumping and may be achieved by utilizing circularly polarized electromagnetic radiation having energy in aligning wavelengths. These aligning wavelengths are, by definition, equivalent to the wavelength separation between the ground state of the resonant media and the first optically excited state of the resonant media. A more complete description of optical pumping may be found in texts and in technical literature such as the article "Optical Pumping" by Arnold L. Bloom in the October 1960 issue of Scientific American magazine.

When a resonant medium is optically pumped so that virtually all the particles comprising the resonant media are aligned into a preselected magnetic substate, the magnetic moments associated with each particle are are aligned parallel to the direction of the unidirectional magnetic field. Those resonant media having a positive magnetic moment exhibit a net magnetic moment for the pumped resonant media which is aligned parallel and in the same sense as the applied weak unidirectional magnetic field; for resonant media having a negative net magnetic moment, a net magnetic moment is aligned parallel but in opposite sense to the applied weak unidirectional magnetic field.

Since each of the particles comprising the resonant medium has angular momentum when the relative direction of the weak unidirectional magnetic field is changed, the aligned particles precess about the new direction in attempting to align with the new direction. The frequency of this precessional rate is the Larmor frequency and is equivalent to the frequency associated with the separation between each adjacent magnetic substate of the resonant medium. For a positive net magnetic moment the resonant medium exhibits a precession in a positive direction, and for a negative net magnetic moment the resonant medium exhibits a precession in a negative direction. Thus, for angular rotation in a negative direction about an axis parallel to the direction of the weak unidirectional magnetic field, a resonant medium with a positive net magnetic moment will exhibit an apparent Larmor frequency greater than the true Larmor frequency by an amount equivalent to the angular rotation rate. For a negative net magnetic moment exhibited by a resonant medium, the apparent Larmor frequency is less than the Larmor frequency by an amount equivalent to the angular rotation rate. Equation 1 below shows this relationship.

$$f = \Gamma H \pm \Omega \qquad \text{Equation 1}$$

where:
$f$ = apparent Larmor frequency
$\Gamma$ = gyromatic ratio of the resonant medium
$H$ = total magnetic field strength
$\Omega$ = angular rotation rate If measurements of the apparent Larmor frequency are simultaneously made on a first resonant medium exhibiting a positive net magnetic moment and on a second resonant medium exhibiting a negative net magnetic moment that are both exposed to substantially the same magnetic field environment during an angular rotation, the relation shown in Equation 2 is derived.

$$\Omega = \frac{f_1 \Gamma_2 - f_2 \Gamma_1}{\Gamma_1 + \Gamma_2} \qquad \text{Equation 2}$$

where:
Subscript "1" refers to the resonant medium exhibiting a positive net magnetic moment
Subscript "2" refers to the resonant medium exhibiting a negative net magnetic moment From this equation it can be seen that the angular rotation rate is independent of magnetic field strength and thus, variations in magnetic field strength will not affect accuracy of measurement of angular rotation rate. It is also apparent from Equation 2 that, in carrying out the principles of this invention, it is not necessary to know precisely the actual value of the magnetic field since it is eliminated from the equation which yields the angular rotation rate. Further, an examination of Equation 2 shows that the denominator is the sum of the gyromagnetic ratios of the first and the second resonant media. Since it is a sum, the equation does not become indeterminate for the condition where the gyromagnetic ratios of the first and the second media are equal, which would be the case for resonant media having the same sign associated with their net magnetic moments.

FIGURE 1 illustrates the apparatus associated with one embodiment of this invention. In this embodiment, a gas cell means 10 contains a first resonant medium 12 and a second resonant medium 14. The medium 12 exhibits a positive net magnetic moment and the medium 14 exhibits a negative net magnetic moment. The resonant media 12 and 14 are preferably maintained in the same gas cell 10. However, if the resonant medium 12 is not compatible with the resonant medium 14, separate gas cells may be utilized for individually containing the resonant media 12 and 14. If two such gas cells are utilized, the two gas cells are placed in uniform magnetic field environment relationship to each other during operation of the unit. This may be achieved by having the two cells in close juxtaposition to each other.

An optical pumping lamp means 16, a polarizer means 18, and filter means 20 are oriented to subject the resonant media 12 and 14 to an optical pumping light beam 22 in a preselected direction.

The optical pumping light beam 22 contains energy in those aligning wavelengths necessary to effect a transition of both medium 12 and medium 14 into a preferred quantum energy magnetic substate. Thus, for example, the optical pumping lamp 16 may be one lamp containing particles 15 that comprise the medium 12 and particles 13 that comprise the medium 14; or separate pumping lamps, each emitting electromagnetic radiation having energy in wavelengths corresponding to the required aligning wavelengths for effecting transitions to the preferred quantum energy state condition of medium 12 and medium 14, respectively, may be utilized. Similarly, the filter means 20 preferably transmits only energy in the aligning wavelengths required to effect this preferred quantum energy condition of both resonant media 12 and 14. The optical pumping lamp 16 includes a transparent tube member 17 which contains the particles 13 and 15 required for generation of the optical pumping light beam 22. An energizing coil means 19 is powered by signal source 21 and is positioned to energize the particles 13 and 15 whereby they are induced to emit electromagnetic radiation containing energy in the wavelengths corresponding to their emission spectra which contains energy in the required aligning wavelengths. These aligning wavelengths may, for example, be equivalent to the wavelengths associated with the quantum transitions of the resonant media 12 and 14 from a ground energy state to a first optically excited energy state.

A unidirectional magnetic field generator, illustrated by coil means 24, is oriented to subject the resonant media 12 and 14 to a weak undirectional field 26 in the preselected direction and is powered by power source 27. The strength of the weak unidirectional magnetic field 26 is such that it induces Zeeman splitting in the resonant media 12 and 14. An optical detection lamp means 28, a second polarizer means 18', and detection light filter means 30 are oriented to subject the resonant media 12 and 14 to an optical detection light beam 32 in a direction perpendicular to the preselected direction. The optical detection lamp means 28 has the same characteristics that are associated with the optical pumping lamp means 16, described above, and the optical detection light beam 32 is similar to the optical pumping light beam 22. The optical detection light beam filter means 30 preferably transmits energy substantially only in the aligning wavelengths associated with resonant media 12 and 14 which are those wavelengths equivalent to the energy separation between, for example, the ground energy state and the first optically excited energy state of the media 12 and 14.

A detector means 34 is oriented to receive the optical detection light beam 32 after is traverses the resonant media 12 and 14 and provides an output signal proportional to the intensity of the detected optical detection light beam 32.

Two alternating magnetic field generating means, such as the pair of coils 36 and 38 and the pair of coils 40 and 42, are oriented to subject the resonant media 12 and 14 simultaneously to two alternating magnetic fields 44 and 46, respectively.

In operation, the resonant media 12 and 14 are subjected to the optical pumping light beam 22, optical detection light beam 32, weak unidirectional magnetic field 26, alternating magnetic field 44, and alternating magnetic field 46 in the above described directions. The optical pumping light beam 22 and weak unidirectional magnetic field 26 tend to align the net magnetic moments of the resonant media 12 and 14 into a direction parallel to the preselected direction. Thus, the positive net magnetic moment of resonant medium 12, illustrated by vector 50, tends to be aligned in the same sense as the weak unidirectional magnetic field 26; and the negative net magnetic moment of the resonant media 14, illustrated by vector 52, tends to be aligned in an opposite sense to the weak unidirectional magnetic field 26. However, due to the interaction of the alternating magnetic field 44 and alternating magnetic field 46 at frequencies corresponding, respectively, to the Larmor frequency of resonant medium 12 and resonant medium 14, the net magnetic moments 50 and 52 precess in a plane perpendicular to the preselected direction, as illustrated by the vectors 50a and 52a. The positive net magnetic moment vector 50a may be considered to precess in a clockwise (positive) direction and the negative net magnetic moment 52a to precess in a counter-clockwise (negative) direction under the influence of the alternating magnetic fields 44 and 46. The frequency of the precession is the Larmor frequency for the resonant media 12 and 14.

When there is an angular rotation rate $\Omega$ of the apparatus about an axis 48 that is parallel to the preselected direction, however, the resonant media exhibit a changed Larmor frequency which is the apparent Larmor frequency of the resonant media 12 and 14. For an angular rotation rate Ω in a negative direction, the apparent Larmor frequency of the resonant medium 12 is greater than the Larmor frequency by an amount Ω and the apparent Larmor frequency of the resonant medium 14 is less than the Larmor frequency by an amount Ω.

The precessing net magnetic moments 50a and 52a each modulate the intensity of the optical detection light beam 32 at their respective apparent Larmor frequencies. Thus, the output signal from detector means 34, in this embodiment, may be considered to be composed of two frequencies superimposed upon each other, as shown in FIGURE 2. The frequency $f_1$ in FIGURE 2 is the apparent Larmor frequency corresponding to the apparent precessional frequency of the resonant medium 12 and the frequency $f_2$ is the apparent Larmor frequency corresponding to the precessional frequency of the resonant medium 14.

The output signal from the detector means 34 is fed into a frequency separation means 54 which, by well-known means, divides the output signal from the detector 34 into two signals: one signal of the frequency $f_1$ and one signal of the frequency $f_2$. These two frequencies are then amplified in amplifier means 56 and their respective phases controlled in phase control means 58. The amplified and phase controlled signal at frequency $f_1$ is then fed into a signal source 60 which establishes the alternating magnetic field 44. Similarly, the amplified and phase controlled signal at frequency $f_2$ is fed into a signal source 62 which establishes the alternating magnetic field 46. This control circuitry provides a servo feed-back loop to maintain the frequency of the alternating magnetic fields 44 and 46 at the apparent Larmor frequency of the resonant media 12 and 14 for the angular rotation rate Ω and thereby maintains precession of the net magnetic moments 50a and 52a. Therefore, there is a resultant induced precession of the net magnetic moments of the media 12 and 14. The positive net magnetic moment 50a of the resonant medium 12 precesses at a frequency corresponding to $f_1$, and the negative net magnetic moment 52a of the resonant medium 14 precesses at the frequency $f_2$. Both of these precessional motions are in a plane perpendicular to the preselected direction, but in opposite directions, as described above. These two precessing net magnetic moments 50a and 52a independently modulate the optical detection light beam 32 and result in the output signal from detector means 34 described above and as shown in FIGURE 2. These two frequencies in the output signal and the gyromagnetic ratios of the resonant media 12 and 14 are utilized to compute the angular rotation rate Ω in accordance with the equations delineated previously.

It has been found that the pumping effect of the optical pumping light beam 22 upon the resonant media 12 and 14 may be enhanced by including in the gas cell means 10 a buffer gas 64. In the preferred embodiment of this invention, the buffer gas 64 is selected from the class consisting of nitrogen, hydrogen, and helium and is maintained at a partial pressure in the gas cell 10 of approximately 10 millimeters of mercury absolute.

The particles 13 and 15 in the tube means 17 of the optical pumping lamp 16 need not be identical to the particles comprising the resonant media 12 and 14. It is only necessary that the particles 13 and 15 emit electromagnetic radiation having energy in the aligning wavelengths for effecting the preferred quantum energy condition in the resonant media 12 and 14. Thus, for example, it has been found that mercury 199 utilized as a resonant medium may be effectively pumped by the electromagnetic radiation emitted from mercury 204, and mercury 201 may be reflectively pumped by the electromagnetic radiation emitted from mercury 198. There fore, mercury 199 and mercury 201 may be contained in the gas cell 10 as resonant media 12 and 14, respectively, at partial pressures of approximately $10^{-4}$ millimeters of mercury, respectively, and mercury 204 and mercury 198 contained in the tube means 17 as particles 13 and 15, respectively.

There are many other combinations and assemblies wherein the gas cell arrangement of this invention may be utilized. It is not intended that this invention be limited by the specific embodiments herein illustrated and described and the following claims are intended to cover all changes, modifications, and adaptations of this gas cell arrangement which do not depart from the true scope and spirit of the invention.

What is claimed as new and is desired to be secured by Letters Patent of the United States is:

1. A gas cell arrangement comprising, in combination: a body member having walls defining a cavity and said walls transparent to magnetic energy and preselected wavelengths of electromagnetic radiation; a first resonant medium contained within the cavity and said first resonant medium exhibiting a positive net magnetic moment; a second resonant medium contained within the cavity and said resonant medium exhibiting a negative net magnetic moment; means for aligning said net magnetic moment of said first resonant medium and said net magnetic moment of said second resonant medium in a first direction; means for inducing a precession of said net magnetic moment of said first resonant medium and said net magnetic moment of said second resonant medium about said first direction in a manner such that the net magnetic moment of said first resonant medium precesses in a first rotational direction and said net magnetic moment of said second resonant medium simultaneously precesses in a second and opposite rotational direction; and means for detecting the precessional rotation rates of the net magnetic moments of said first and said second resonant media.

2. A gas cell arrangement comprising, in combination: a body member having walls defining a cavity and said walls transparent to magnetic energy and preselected wavelengths of electromagnetic radiation; a first resonant medium contained within the cavity and said first resonant medium exhibiting a positive net magnetic moment; a second resonant medium contained within the cavity and said second resonant medium exhibiting a negative net magnetic moment; a buffer gas comprising one of the gases hydrogen, nitrogen, and helium contained within the cavity; unidirectional magnetic field generating means for generating a weak unidirectional magnetic field in regions containing said first and said second resonant media in a preselected direction; optical pumping lamp means coupled to said body member for generating a beam of electromagnetic radiation containing energy in aligning wavelengths of said first and said second resonant media and positioned to direct said beam of electromagnetic radiation to traverse said first and said second resonant media in a direction parallel to said preselected direction; polarizer means coupled to said optical pumping lamp generating means for circularly polarizing said electromagnetic radiation; filter means coupled to said optical pumping lamp means for filtering said circularly polarized electromagnetic radiation to transmit substantially only circularly polarized aligning wavelengths; alternating magnetic field generating means coupled to said body member for generating alternating magnetic fields at predetermined frequencies in regions containing said first and said second resonant media whereby said net magnetic moment of said first and said second media are induced to simultaneously precess in a plane substantially perpendicular to said preselected direction with the direction of precessional rotation of said net magnetic moment of said first resonant medium being opposite to the direction of precessional rotation of said net magnetic moment of said second resonant medium; and optical detection means coupled to said body member for selectively detecting the precessional rotation rate of said net magnetic moment of said first and said second resonant media.

3. A gas cell arrangement comprising, in combination: a body member having walls defining a cavity and said walls transparent to magnetic energy and preselected wavelengths of electromagnetic radiation; a first resonant medium contained within the cavity and said first resonant medium exhibiting a positive net magnetic moment; a second resonant medium contained within the cavity and said second resonant medium exhibiting a negative net magnetic moment; a buffer gas comprising one of the gases hydrogen, nitrogen, and helium contained within the cavity; unidirectional magnetic field generating means for generating a weak unidirectional magnetic field in regions containing said first and said second resonant media in a preselected direction; optical pumping lamp means coupled to said body member for generating a beam of electromagnetic radiation containing energy in aligning wavelengths of said first and said second resonant media and positioned to direct said beam of electromagnetic radiation to traverse said first and said second resonant media in a direction parallel to said preselected direction; polarizer means coupled to said optical pumping lamp generating means for circularly polarizing said electromagnetic radiation; filter means coupled to said optical pumping lamp means for filtering said circularly polarized electromagnetic radiation to transmit substantially only circularly polarized aligning wavelengths; alternating magnetic field generating means coupled to said body member for generating alternating magnetic fields at predetermined frequencies in regions containing said first and said second resonant media whereby said net magnetic moment of said first and said second resonant media are induced to simultaneously precess in a plane substantially perpendicular to said preselected direction with the direction of precessional rotation of said net magnetic moment of said first resonant medium being opposite to the direction of precessional rotation of said net magnetic moment of said second resonant medium; optical detection means coupled to said body member for detecting the precessional rotation rates of said net magnetic moments of said first and said second resonant media; and control means connected to said alternating magnetic field generating means to control the frequencies of said alternating magnetic fields in response to the detected precessional rotation rates.

4. A gas cell arrangement comprising, in combination: a body member having walls defining a cavity and said walls transparent to magnetic energy and preselected wavelengths of electromagnetic radiation; a first resonant medium contained within the cavity and said first resonant medium exhibiting a positive net magnetic moment; a second resonant medium contained within the cavity and said second resonant medium exhibiting a negative net magnetic moment; a buffer gas comprising one of the gases hydrogen, nitrogen, and helium contained within the cavity; unidirectional magnetic field generating means for generating a weak unidirectional magnetic field in regions containing said first and said second resonant media in a preselected direction; a first optical pumping lamp means coupled to said body member for generating a first beam of electromagnetic relation containing energy in aligning wavelengths of said first resonant medium and positioned to direct said first beam of electromagnetic radiation to traverse said first resonant medium in a direction parallel to said preselected direction; a second optical pumping lamp means coupled to said body member for generating a second beam of electromagnetic radiation containing energy in aligning wavelengths of said second resonant medium and positioned to direct said second beam of electromagnetic radiation to traverse said second resonant medium in a direction parallel to said preselected direction; polarizer means coupled to said first and said second optical pumping lamp means for circularly polarizing said first and said second beams of electromagnetic radiation; a first filter means coupled to said first optical pumping lamp means for filtering said first beam of electromagnetic radiation to transmit substantially only energy in said aligning wavelengths of said first resonant medium; a second filter means coupled to said second optical pumping lamp means for filtering said second beam of electromagnetic radiation to transmit substantially only energy in said aligning wavelengths of said second resonant medium; a first alternating magnetic field generating means coupled to said body member for generating a first alternating magnetic field at a first predetermined frequency in regions containing said first resonant medium; a second alternating magnetic field generating means coupled to said body member for generating a second alternating magnetic field at a second predetermined frequency in regions containing said second resonant medium whereby said net magnetic moments of said first and said second media are induced to simultaneously precess in a plane substantially perpendicular to said preselected direction with the direction of precessional rotation of said net magnetic moment of said first resonant medium being opposite to the direction of precessional rotation of said net magnetic moment of said second resonant medium; optical detection means coupled to said body member for selectively detecting the precessional rotation rate of said net magnetic moment of said first and said second resonant media; and control means connected to said first and said second alternating magnetic field generating means to control the frequency of said first and said second alternating magnetic fields in response to the selectively detected precessional rotation rates.

5. A gas cell arrangement comprising, in combination: a body member having walls defining a sealed cavity and said walls transparent to magnetic energy and preselected wavelengths of electromagnetic radiation; a plurality of atoms in the gaseous state of mercury 199 contained within the cavity at a partial pressure of about $10^{-4}$ millimeters of mercury absolute; a plurality of atoms in the gaseous state of mercury 201 contained within the cavity at a partial pressure of $10^{-4}$ millimeters of mercury absolute; a buffer gas comprising one of the gases hydrogen, nitrogen, and helium contained within the cavity at a partial pressure of 10 millimeters of mercury absolute; unidirectional magnetic field generating means for generating a weak unidirectional magnetic field in regions containing said atoms of said mercury 199 and said atoms of said mercury 201 in a pre-selected direction; a first optional pumping lamp means coupled to said body member and containing mercury 204 for generating a first beam of electromagnetic radiation containing energy in wavelengths corresponding to the emission spectra of said mercury 204 and positioned to direct said first beam of electromagnetic radiation to traverse said atoms of said mercury 199 in a direction parallel to said preselected direction; and a second optical pumping lamp means containing mercury 198 for generating a second beam of electromagnetic radiation containing energy in wavelengths corresponding to the emission spectra of mercury 198 and positioned to direct said second beam of electromagnetic radiation to traverse said atoms of said mercury 201 in a direction parallel to said pre-selected direction.

6. A gas cell arrangement comprising, in combination: a body member having walls defining a sealed cavity and said walls transparent to magnetic energy and preselected wavelengths of electromagnetic radiation; a plurality of atoms in the gaseous state of mercury 199 contained within the cavity at a partal pressure of $10^{-4}$ millimeters of mercury absolute; a plurality of atoms in the gaseous state of mercury 201 contained within the cavity at a partial pressure of about $10^{-4}$ millimeters of mercury absolute; a buffer gas comprising one of the gases hydrogen, nitrogen, and helium contained within the cavity at a partial pressure of 10 millimeters of mercury absolute; unidirectional magnetic field generating means for generating a weak unidirectional magnetic field in regions containing said atoms of said mercury 199 and said atoms of said mercury 201; a first optical pumping lamp means coupled to said body member and containing mercury 204 for generating a first beam of electromagnetic radiation containing energy in wavelengths corresponding to the emission spectra of said mercury 204 and positioned to direct said first beam of electromagnetic radiation to traverse said atoms of said mercury 199 in a direction parallel to said pre-selected direction; a second optical pumping lamp means containing mercury 198 for generating a second beam of electromagnetic radiation containing energy in wave-lengths corresponding to the emission spectra of mercury 198 and positioned to direct said second beam of electromagnetic radiation to traverse said atoms of said mercury 201 in a direction parallel to said preselected direction; polarizer means coupled to said first and said second optical pumping lamp means for circularly polarizing said first and said second beam of electromagnetic radiation; and alternating magnetic field generating means coupled to said body member for selectively generating alternating magnetic fields at the Larmor frequency of said mercury 199 and said mercury 201 in regions containing said atoms of said mercury 199 and said atoms of said mercury 201, whereby a net magnetic moment of said mercury 199 precesses in a first direction and a net magnetic moment of said mercury 201 precesses in a second direction opposite to said first direction.

7. A gas cell arrangement comprising, in combination: a body member having walls defining a sealed cavity and said walls transparent to magnetic energy and preselected wavelengths of electromagnetic radiation; a plurality of atoms in the gaseous state of mercury 199 contained within the cavity at a partial pressure of $10^{-4}$ millimeters of mercury absolute; a plurality of atoms in the gaseous state of mercury 201 contained within the cavity at a partial pressure of $10^{-4}$ millimeters of mercury absolute; a buffer gas comprising one of the gases hydrogen, nitrogen, and helium contained within the cavity at a partial pressure of 10 millimeters of mercury absolute; unidirectional magnetic field generating means for generating a weak unidirectional magnetic field in regions containing said atoms of said mercury 199 and said atoms of said mercury 201 in a preselected direction; a first optical pumping lamp means coupled to said body member and containing mercury 204 for generating a first beam of electromagnetic radiation containing energy in wavelengths corresponding to the emission spectra of said mercury 204 and positioned to direct said first beam of electromagnetic radiation to traverse said atoms of said mercury 199 in a direction parallel to said preselected direction; a second optical pumping lamp means containing mercury 198 for generating a second beam of electromagnetic radiation containing energy in wavelengths corresponding to the emission spectra of mercury 198 and positioned to direct said second beam of electromagnetic radiation to traverse said atoms of said mercury 201 in a direction parallel to said preselected direction; polarizer means coupled to said first and said second optical pumping lamp means for circularly polarizing said first and said second beam of electromagnetic radiation; alternating magnetic field generating means coupled to said body member for selectively generating alternating magnetic fields at the Larmor frequency of said mercury 199 and said mercury 201 in regions containing said atoms of said mercury 199 and said atoms of said mercury 201, whereby a net magnetic moment of said mercury 199 precesses in a first direction and a net magnetic moment of said mercury 201 precesses in a second direction opposite to said first direction; an optical detection means coupled to said body member for selectively detecting the precessional rotation rate of said net magnetic moment of said mercury 199 and said net magnetic moment of said mercury 201; and control means connected to said alternating magnetic field generating means for selectively controlling the frequency of said alternating magnetic fields in response to the detected precessional rotation rates.

References Cited by the Examiner

UNITED STATES PATENTS

| | | | |
|---|---|---|---|
| 2,951,992 | 9/1960 | Arditi | 324—0.5 |
| 3,071,721 | 1/1963 | Dehmelt | 324—0.5 |

OTHER REFERENCES

AFOSR–TR–59–26, "Research on Nuclear Magnetic Resonance Techniques," final report copy obtained from AEC, Oakridge, Tenn., April 1959.

Anderson et al.: Physical Review, vol. 116, No. 1, October 1959, pp. 87–99 incl.

Bell et al.: Physical Review, vol. 107, No. 6, September 1957, pp. 1559–1565.

Cagnac et al.: Academie des Sciences, Comptes Rendus, vol. 249, No. 1, July 6, 1959, pp. 77–79 incl.

Kastler: Le Journal de Physique et al. Radium, vol. 11, June 1950, pp. 225–263 incl.

Physical Review, vol. 109, pp. 375–380, Jan. 15, 1958.

CHESTER L. JUSTUS, *Primary Examiner.*

BENJAMIN A. BORCHELT, MAYNARD R. WILBUR,
*Examiners.*

P. G. BETHERS, *Assistant Examiner.*